April 2, 1940.　　M. DAVIS ET AL　　2,196,141
PIPE ROTATING DEVICE
Filed Sept. 25, 1939　　3 Sheets-Sheet 1

Marie Davis,
James E. Lacey &
Alluwee C. Andrews
INVENTORS

BY Victor J. Evans & Co.
ATTORNEYS

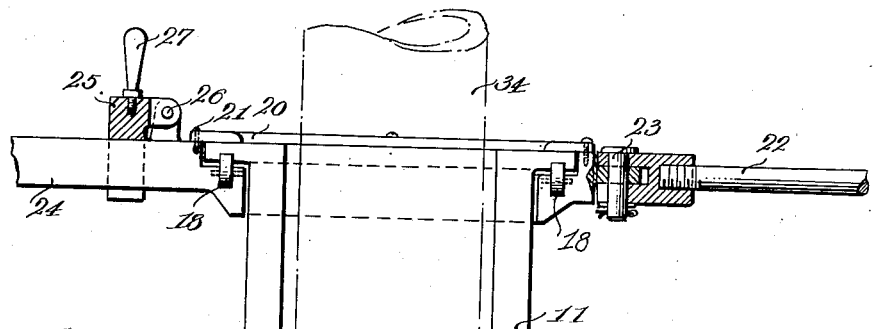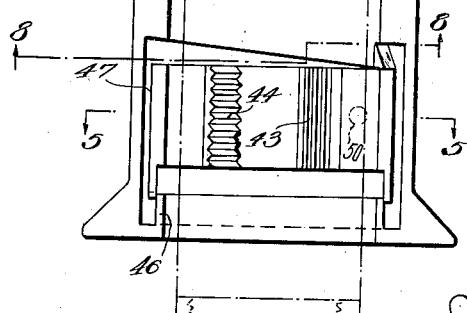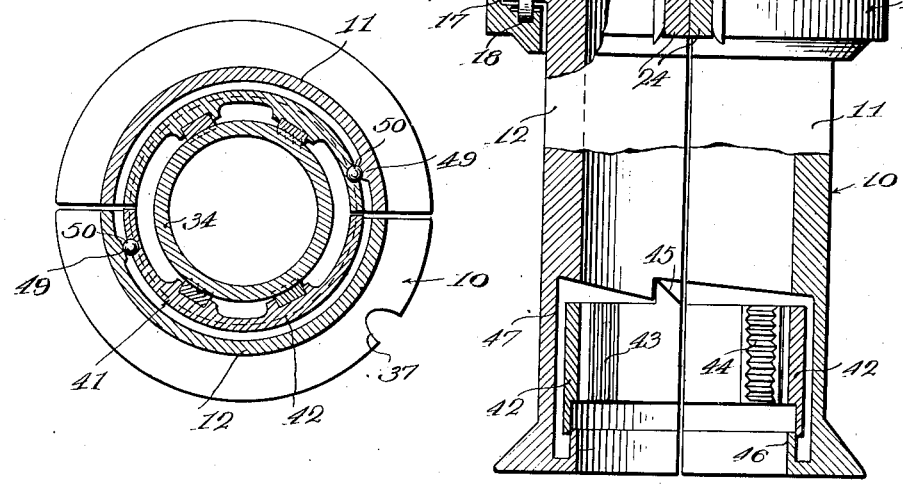

April 2, 1940.  M. DAVIS ET AL  2,196,141

PIPE ROTATING DEVICE

Filed Sept. 25, 1939  3 Sheets-Sheet 3

Marie Davis,
James E. Lacey &
Alluwee C. Andrews INVENTORS

BY Victor J. Evans & Co.

ATTORNEYS

Patented Apr. 2, 1940

2,196,141

UNITED STATES PATENT OFFICE 2,196,141

PIPE ROTATING DEVICE

Marie Davis, James E. Lacy, and Alluwee C. Andrews, Dayton, Tex.

Application September 25, 1939, Serial No. 296,502

5 Claims. (Cl. 255—35)

This invention relates to pipe rotating devices particularly applicable to pipe which is to be made up into a string and let down into an oil well bore.

The present apparatus of this type is very dangerous due to chain rings breaking and the workmen getting hands caught around the pipe. With this in mind an object of the present invention is to provide a device of this character which may be easily applied to a section of pipe to be made up into a string, without the use of chains, and which will not necessitate the workmen handling any of the moving parts of the device during the operation of screwing up a pipe joint.

A further object is to provide a device of this character which will be formed of a few strong simple and durable parts which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 3 is a side elevation of one-half section of the spool and one-half section of the pipe clamp in the spool.

Figure 4 is a side elevation of the device turned through an angle of 90° from the position shown in Figure 3, with parts in section.

Figure 5 is a cross sectional view of the device taken on the line 5—5 of Figure 3.

Figure 1:
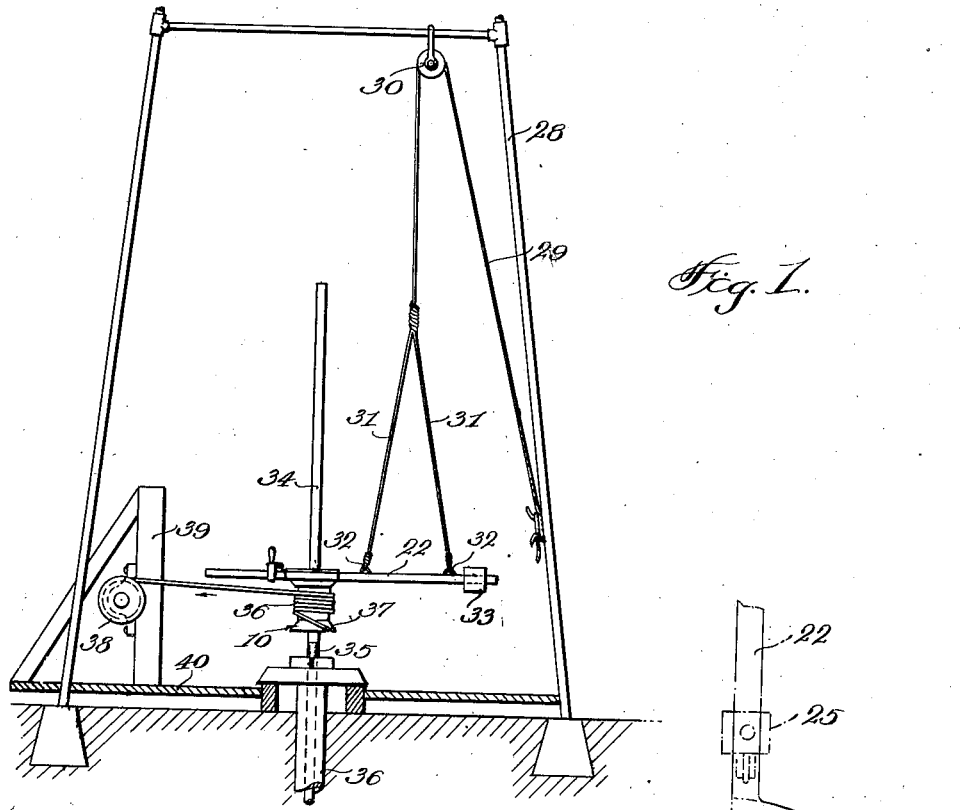
Figure 1 is a side elevation, with parts in section, of a pipe rotating device constructed in accordance with the invention.

Referring now to the drawings in which like characters of reference designate similar parts in the various views, the pipe rotating device is shown to comprise a spool 10 consisting of semi-cylindrical sections 11 and 12, as best shown in Figure 4. The spool is provided at its upper end with an outer flange 13 by means of which the spool is rotatably mounted in a spool support 14.

The spool support comprises semi-circular sections 15 and 16 recessed at the top as shown at 17 to receive the flange 13 of the spool. Roller bearings 18 are journaled in the recess of the support and project into races 19 formed in the bottom face of the flange 13 of the spool. Semi-circular cap plates 20 are removably secured to the support by screws 21 and permit application and removal of the spool from the support.

Figure 2:
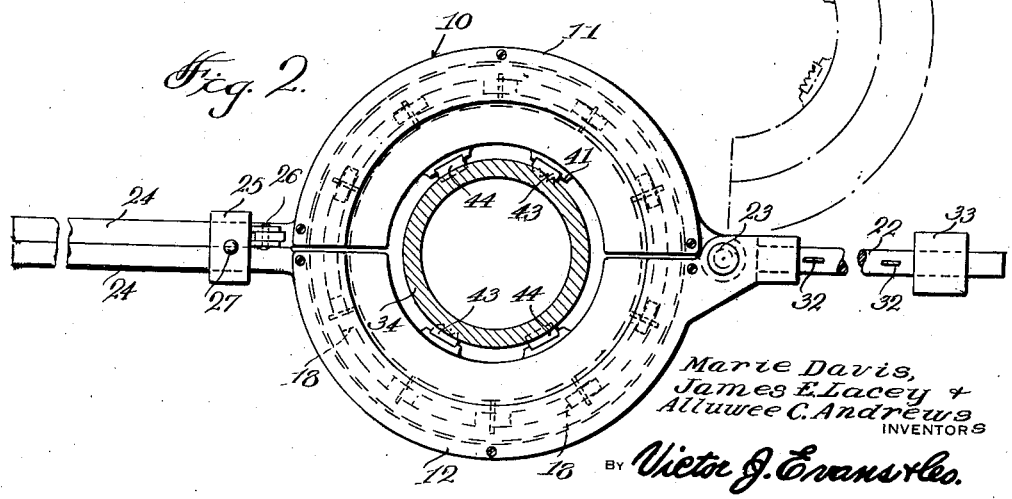
Figure 2 is an enlarged plan view of the pipe rotating device showing a length of pipe clamped therein.

A rod 22 extends radially from the support at those ends of the support sections which are pivotally connected together by a pivot pin 23, as best shown in Figure 3. Rods 24 extend side by side radially from the free ends of the sections of the support as best shown in Figure 2. A U-shaped latching member 25 is pivoted to one of the rods as shown at 26 and is adapted to be disposed astride of both rods 24 to hold the sections of the support closed upon the flange of the spool. A handle 27 extends upward from the latching member for manipulating the member.

The spool is supported from a derrick 28, as shown in Figure 1 by a cable 29 which is looped over a pulley 30 and provided with terminal branches 31 which are secured to eyes 32 carried by the rod 22. A weight 33 is secured to the free end of the rod 22 to counterbalance the weight of the spool and spool support. The cable suspends the spool in position to receive a length of pipe 34 which is to be threaded upon a length of pipe 35 to make up a string which is to be let down into a well bore 36.

The spool sections are held in assembled relation by the spool support and by a cable 36 which is wound upon the spool and through the medium of which the spool is turned. One end of the cable is engaged in any preferred manner in a notch 37 formed in the bottom edge of the spool and the other end of the cable is connected to a cathead 38 which is supported upon an upright 39 secured to the derrick floor 40.

Figure 6:
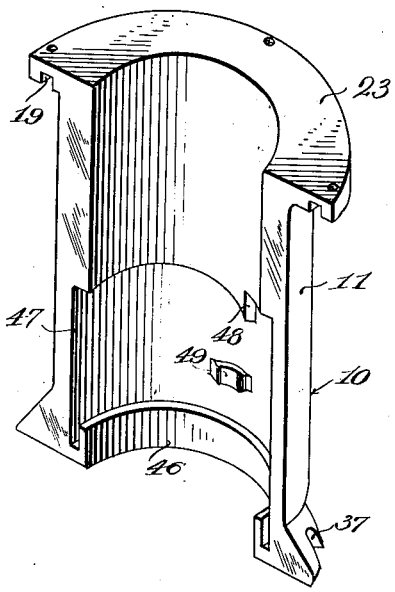
Figure 6 is a detail perspective view of one of the sections of the spool.
Figure 7:
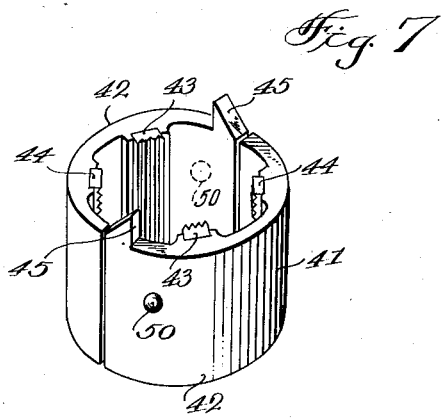
Figure 7 is a detail perspective view of both sections of the pipe clamp.
Figure 8:
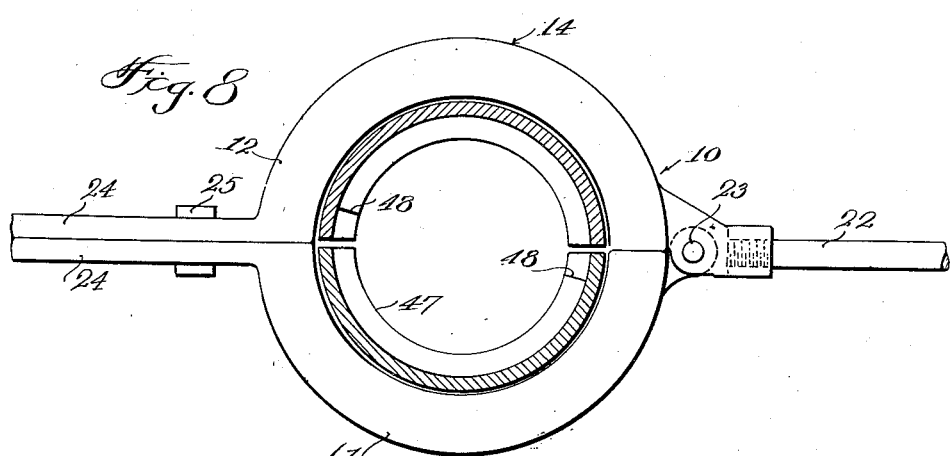
Figure 8 is a cross sectional view taken on the line 8—8 of Figure 3 with the clamp and pipe removed.

As best shown in Figure 7 a pipe clamp 41 is confined within the sections of the spool and comprises similar cylindrical sections 42 having at oppositely disposed points on their inner faces vertically serrated jaw members 43, and having at diametrically opposite points 90° in advance of the members 43, horizontally serrated jaw members 44. The members 43 and 44 prevent the clamp from slipping either vertically or horizontally on the pipe 34. The sections of the clamp are provided at diametrically opposite points on the upper edge with teeth 45, one tooth being carried by each section. The sections of the spool are provided at the bottom with a respective arcuate flange 46 of L-shaped cross section to receive the bottom edge portions of the pipe clamp 41. The sections of the spool are uniformly increased in diameter as shown at 47 in Figure 6 to receive the sections of the pipe clamp and teeth 48 are formed at diametrically opposite points in the spool section against which the teeth 45 of the pipe clamp are lodged to permit the spool and pipe clamp to be rotated as a unit by the cable in a direction to screw up the pipe into a string, when the cable is actuated by the cathead.

As best shown in Figure 5 the sections 11 and 12 of the spool are provided at diametrically opposite points on their inner faces with projections 49. On diametrically opposite points on the opposite faces of the sections 42 of the pipe clamp 41 thrust balls 50 are seated. The purpose of the projections 49 is to engage the thrust balls 50 and push the sections of the pipe clamp into tight engagement with the pipe 34.

In operation, the sections of the spool carrying respective sections of the pipe clamp are closed upon the pipe 34 and then the latching member 25 is placed astride the rods 24 to lock the spool and pipe clamp rigidly upon the pipe 34. The cable is then wound upon the spool and the end placed in the notch 37. The cathead is then started to unwind the cable from the spool and thereby rotate the spool to screw up the pipe 34 into the next lowermost pipe 35.

From the above description it is thought that the construction and operation of the invention will be fully understood without further explanation.

What is claimed is:

1. A pipe rotating apparatus comprising a spool formed of semi-cylindrical sections, a spool support formed of semi-circular sections, a flange on the upper end of the spool rotatably received in the support, said support sections being pivotally connected together at one end, a rod extending radially from the pivotally connected ends of the support section, rods extending radially from the free ends of the support section, latching means for connecting the last named rods together, said rods forming means by which the support may be suspended within a derrick, a flange on the lower end of the spool disposed within the bore of the spool, a pipe clamp formed of semi-cylindrical sections secured in the bore of the spool by the last named flange, and a cable wound upon the spool for rotating the spool in the support.

2. A pipe rotating apparatus comprising a spool support formed of sections hinged together at one end, a spool rotatably mounted in said support and formed of sections hingedly connected together at one end adapted to be opened and closed by opening and closing the support sections, a pipe clamp in the spool formed of two loose sections carried by respective sections of the spool, jaws on the inner surface of the pipe clamp sections, and coacting means carried by the spool and the pipe clamp sections for urging the pipe clamp sections toward each other to operative position.

3. A pipe rotating apparatus comprising a spool support formed of sections pivotally connected together at one end, means for suspending the support from a derrick, a spool rotatably mounted in the support and formed of sections hingedly connected together at one end, a pipe clamp in the spool formed of oppositely disposed loose sections, teeth formed at diametrically opposite points on the spool sections, teeth formed at diametrically opposite points on the clamp sections adapted to engage the teeth of the spool section for connecting the clamp sections to be rotated by the spool, and a cable wound on the spool for rotating the spool and clamp as a unit in the spool support.

4. A pipe rotating apparatus comprising a spool support formed of sections hinged together at one end, means for suspending the support within a derrick, a spool rotatably carried by the support and formed of sections hinged together at one end, a pipe clamp in the spool formed of cylindrical sections loosely mounted in the respective sections of the spool, vertically serrated jaws on the inner surface of the pipe clamp sections, horizontally serrated jaws on the inner surface of the pipe clamp sections, and co-acting projections on the inner surfaces of the pipe clamp sections and spool sections adapted to be brought into engagement with each other when the spool sections are closed and urge the pipe clamp sections to operative position.

5. A pipe rotating apparatus comprising a spool formed of semi-cylindrical sections, a spool support formed of semi-circular sections, the spool support sections being recessed at the top, a flange on the spool received in the recessed portions of the spool support sections, roller bearings carried by the recess portions of the spool support sections engaging the bottom of the flange, cap plates removably secured to the spool support sections and engaging the top of the flange to removably hold the spool sections secured to the spool support sections, means for suspending the spool support within a derrick, and a pipe clamp formed of cylindrical sections carried by respective spool sections.

MARIE DAVIS.
JAMES E. LACY.
ALLUWEE C. ANDREWS.